(12) United States Patent
Ohlendorf (10) Patent No.: US 9,949,151 B2
(45) Date of Patent: Apr. 17, 2018

(54) HF TESTING EQUIPMENT AND METHOD FOR TESTING D2D-ENABLED MOBILE COMMUNICATIONS TERMINALS

(71) Applicant: Rohde & Schwarz GmbH & Co. KG, München (DE)

(72) Inventor: Rainer Ohlendorf, Muesing OT Wimpasing (DE)

(73) Assignee: ROHDE & SCHWARZ GMBH & CO. KG, Munich (DE)

( * ) Notice: Subject to any disclaimer, the term of this patent is extended or adjusted under 35 U.S.C. 154(b) by 87 days.

(21) Appl. No.: 15/152,287

(22) Filed: May 11, 2016

(65) Prior Publication Data

US 2016/0337886 A1     Nov. 17, 2016

(30) Foreign Application Priority Data

May 11, 2015 (EP) ..................................... 15167133
Jun. 29, 2015 (EP) ..................................... 15174316

(51) Int. Cl.
*H04W 4/00* (2009.01)
*H04W 24/06* (2009.01)
(Continued)

(52) U.S. Cl.
CPC ........ *H04W 24/06* (2013.01); *H04B 17/0087* (2013.01); *H04B 17/3912* (2015.01); *H04W 76/023* (2013.01); *H04W 92/18* (2013.01)

(58) Field of Classification Search
None
See application file for complete search history.

(56) References Cited

U.S. PATENT DOCUMENTS 8,526,939 B2   9/2013   Harteneck
8,761,684 B2 *   6/2014   Reed ................... H04B 17/0085
                                                    455/423
(Continued)

FOREIGN PATENT DOCUMENTS

GB          2 440 190 A     1/2008
WO    WO 2010/093999 A2    8/2010
WO    WO 2012/082024 A1    6/2012

OTHER PUBLICATIONS

Extended European Search Report for European Patent Application No. 15174316.8 (dated Sep. 19, 2016).
(Continued)

*Primary Examiner* — Anh-Vu Ly
(74) *Attorney, Agent, or Firm* — Shumaker & Sieffert, P.A.

(57) ABSTRACT

HF testing equipment for testing mobile communications terminals emulates the D2D communications capabilities of at least two mobile communications terminals. Using this equipment, interfering radio transmissions that may occur as a result of randomly selected frequency resources are replicated to test the effect thereof in a mobile communications terminal. A channel model of a transmission channel is emulated, and distortion is impressed on the data signal to be transmitted by means of the model. One baseband data signal in the frequency domain is thus obtained for each transmission channel, and this data signal contains the effects of a particular transmission channel on an undistorted data signal. The various baseband data signals are linked together, e.g., by complex multiplication, and transformed into the time domain. A receipt signal for a mobile communications terminal to be tested, produced by taking account of transmission channels and the accompanying channel distortion, is thus emulated.

16 Claims, 4 Drawing Sheets

(51) Int. Cl.
H04W 76/02 (2009.01)
H04B 17/00 (2015.01)
H04B 17/391 (2015.01)
H04W 92/18 (2009.01)

(56) References Cited

U.S. PATENT DOCUMENTS

2016/0226709 A1* 8/2016 Chen .................... G01R 29/105
 370/328
2017/0223563 A1* 8/2017 Yang .................... H04B 17/336
 370/328
2017/0238265 A1* 8/2017 Yang .................... H04W 52/243
 455/522

OTHER PUBLICATIONS

Svedjenas et al., "OTA Device Sensitivity in the Presence of Interference Measured in a Reverberation Chamber," Proc. of the 2014 International Symposium on Electromagnetic Compatibility (EMC Europe 2014), pp. 328-331 (Sep. 1-4, 2014).
Choi et al., "Development of a System-Level Simulator for Evaluating Performance of Device to Devisce Communication Underlaying LTE-Advanced Networks," Fourth Internation Conference on Computational Intelligence, Modeling and Simulation, pp. 330-335 (2012).

* cited by examiner

HF TESTING EQUIPMENT AND METHOD FOR TESTING D2D-ENABLED MOBILE COMMUNICATIONS TERMINALS

PRIORITY CLAIM

This application claims the priority benefit of European Patent Application No. EP; 15167133.6-1505, filed May 11, 2015, and European Patent Application No. 15174316.8, filed Jun. 29, 2015; the disclosures of which are incorporated herein by reference in their entireties.

FIELD OF THE INVENTION

The present invention relates to HF testing equipment and to a method for testing D2D-enabled mobile communications terminals.

TECHNICAL BACKGROUND

The present invention is based in the field of device-to-device (D2D) communication. D2D is a radio standard in LTE (long term evolution) that enables direct communication between various mobile communications terminals while bypassing a base station and thus a corresponding radio network. In the LTE standard, these mobile communications terminals are also referred to as user equipment (UE) and the direct communication link between mobile communications terminals is referred to as a sidelink. The D2D communication is considered to be a means for simplifying peer-to-peer (P2P) services between mobile communications terminals, for simplifying infrastructure-free communication in emergency situations, and for improving the network capacity by transferring data traffic out of the radio communications network. WO 2012/082024 A1 describes an example of D2D communication of this type.

In the following, the present invention and the problem addressed thereby will be explained on the basis of D2D communication, although this does not limit the invention to this type of mobile communications terminals or to the LTE standard.

Owing to the increasing functionality of modern mobile communications terminals, it is becoming ever more important to test them. If a mobile communications terminal is tested in the actual mobile communications network, the conditions are often not reproducible since limiting conditions such as cell power, timing, capacity utilisation, etc., can change constantly. Therefore, testing equipment exists that is designed specifically for testing mobile communications terminals. These mobile communications terminals to be tested are also referred to generally as "device under test" or DUT for short. While current testing equipment can emulate the functionality of base stations, future testing equipment must also be able to test the D2D communications properties of mobile communications terminals.

While D2D represents communication between two mobile communications terminals, situations also occur during practical use where one mobile communications terminal is addressed by a plurality of mobile communications terminals via respective D2D communication links. In this case, the base station of the mobile communications network configures common transmission resources for all the transmitting mobile communications terminals, from which said terminals select individual transmission resources at random. In addition, the corresponding transmission resources are communicated to the receiving mobile communications terminal as a receipt resource. Since the transmission resources are selected at random by the individual mobile communications terminals in the time and frequency domains, the situation may occur where at least two transmitting mobile communications terminals each transmit the data to the receiving mobile communications terminal on the same transmission frequency and at the same time, i.e. in the same time slot. This, however, causes interferences in the transmitted data signals. In this scenario, the receiving mobile communications terminals also have to operate correctly, which has to be verified by appropriate test scenarios. It is thus necessary to also be able to properly test mobile communications terminals under test for the event that interfering radio transmissions occur.

SUMMARY OF THE INVENTION

Against this background, the present invention addresses the need of improving testing of mobile communications terminals.

Accordingly, it is provided:

A HF testing equipment for testing D2D-enabled mobile communications terminals, comprising an emulation device for emulating the D2D function of a plurality of mobile communications terminals, which is designed to emulate a number of independent transmission channels corresponding to the number of mobile communications terminals by generating, for each transmission channel, a baseband data signal specific to each transmission channel on the basis of a predefined channel model, a linking device designed to link the generated baseband data signals, a conversion device designed to generate a receipt signal for a mobile communications terminal to be tested by converting the linked baseband data signal from the frequency domain into the time domain, a communications interface by means of which the HF testing equipment can be coupled to the mobile communications terminal to be tested and by means of which the receipt signal can be sent to the mobile communications terminal to be tested.

A method for testing mobile communications terminals by means of testing equipment, in particular by means of testing equipment according to the invention, comprising the steps of: emulating a first transmission channel for a D2D communication link by generating a first baseband data signal, specific to the first transmission channel, on the basis of a first predefined channel model; emulating at least a second transmission channel, different from the first transmission channel, for a D2D communication link by generating a second baseband data signal, specific to the second transmission channel, on the basis of a second predefined channel model; linking the generated first and second baseband data signals; converting the linked baseband data signal from the frequency domain into the time domain in order to generate a receipt signal for a mobile communications terminal to be tested; sending the generated receipt signal to the mobile communications terminal to be tested.

According to the present invention, testing equipment is provided which emulates the D2D communications capabilities of at least two mobile communications terminals. Using this equipment, it is possible to replicate interfering radio transmissions that may occur as a result of randomly selected frequency resources and to test the effect thereof in a mobile communications terminal to be tested.

For the test, baseband data signals are generated in the frequency domain for each transmission channel. These baseband data signals already contain the effects of each transmission channel on an undistorted data signal. To generate the baseband data signals, a suitable channel model of a transmission channel is emulated, and said model impresses a distortion on the data signal to be transmitted according to the channel model. One baseband data signal is thus obtained for each transmission channel. Next, the various baseband data signals then have to be linked together, e.g. by complex multiplication, and transformed into the time domain. A receipt signal for a mobile communications terminal to be tested, as is produced by taking account of a plurality of transmission channels and the accompanying channel distortion, is thus emulated.

The invention is based on the following consideration:

In each time slot for each subcarrier, a transmission channel can be considered to be a constant complex factor that describes, according to the model, the amplitude (or damping) and phase position at which a data signal to be transmitted by the transmitting mobile communications terminal arrives at the receiver. Depending on how the two selected factors (amplitude and phase position) behave with respect to one another, the combined receipt signal that arrives at the receiving mobile communications terminal and thus at the mobile communications terminal to be tested can be decoded, or also not decoded, for one of the two interfering transmissions.

Taking into account that the two complex factors (amplitude, phase position) vary over time, it may be that different transmissions of the same sequence for the mobile communications terminal to be tested can be decoded at different times. If the mobile communications terminal to be tested has already received knowledge of the content of a data signal to be transmitted, for example by means of previous transmissions, the transmitting mobile communications terminal can subtract an interference from the receipt signal at a later time and thus receive the data blocks from all the transmitting mobile communications terminals one after the other (what is known as advanced receiver/interference cancellation).

By approximating the transmission channels by a complex multiplication at the end of the processing chain of the baseband data signal, it is advantageously possible in the testing equipment to dispense with both a complex fading channel simulation in the time domain and an addition of the HF data signals, which are to be transmitted, of different mobile communications terminals before reaching the mobile communications terminal to be tested.

Moreover, allocations of a restricted size, as occur in particular in sidelink direct discovery, can be easily calculated one after the other on the same hardware in the time multiplex. A control device provided specifically for this purpose ensures that the complex factors of the transmission channel for the individual allocations each correspond to the configured channel model at the time of sending of the corresponding mobile communications terminal. In this way, the decoding performance of the receiving mobile communications terminal can be implemented in testing equipment in a reliable, reproducible and cost-effective manner.

Advantageous embodiments and developments will become apparent from the additional dependent claims and the description with reference to the figures of the drawings.

In a preferred embodiment, the emulation device comprises a signal generator and a channel simulator. The signal generator is designed to generate a different data signal for each transmission channel. Preferably, the channel simulator is designed to use a predefined different channel model for each transmission channel, in that the channel simulator impresses a predefined channel distortion, specific to a particular transmission channel, on each data signal from the particular transmission channel. Preferably, one single transmission signal generator and/or one single channel simulator can also be used for a plurality of transmission channels.

In a particularly preferred embodiment, the signal generator is designed as protocol testing equipment or protocol tester for short. The protocol testing equipment encodes the data to be transmitted according to a predefined protocol stack.

According to a typical development, the channel simulator is designed to replicate the properties of a transmission channel by varying the data signal, which is to be transmitted, according to the predefined channel model in order to generate the transmission channel-specific baseband data signal. The data signal is varied in terms of the amplitude thereof and/or phase. It is thus possible to emulate, for testing purposes, a transmission channel on the basis of which a mobile communications terminal under test can be tested in a specific manner.

In a preferred embodiment of the invention, the channel simulator uses constant filter coefficients to generate the transmission channel-specific baseband data signal and thus to emulate the transmission channel. This is particularly advantageous in the development stage of mobile communications terminals, in which tests are initially carried out on the basic functionality of a mobile communications terminal.

In a particularly preferred alternative embodiment of the invention, the channel simulator uses variable filter coefficients to generate the transmission channel-specific baseband data signal and thus to emulate the transmission channel. The use of variable filter coefficients takes account of a varying transmission channel, as occurs for example when a mobile communications terminal changes location. This alternative embodiment is preferably used after a development process for testing the functionality of a mobile communications terminal under test in real conditions. Preferably, the channel simulator is designed to use different channel coefficients to simulate a predefined channel distortion for each transmission channel.

In a preferred embodiment of the invention, the emulation device calculates the transmission channel-specific baseband data signal by complex multiplication of the data signal, which is to be transmitted, by the filter coefficients of the channel model.

In one embodiment, the emulation device is designed to provide data to be transmitted, to assign the data to be transmitted a plurality of carrier frequencies and encoding parameters per transmission channel, to generate a plurality of modulated carrier data signals according to the assigned carrier frequencies and encoding parameters, and to distort at least one of the modulated carrier data signals by means of a predefined frequency-selective channel model.

In a particularly preferred embodiment, the emulation device is designed to replicate various test scenarios. Examples of such test scenarios may be interference, fading and/or jittering superimposed on a data signal to be transmitted. Other test scenarios would also be conceivable.

In a preferred embodiment of the invention, the conversion device is designed to carry out an IFFT transformation on the linked baseband data signal in order to create the receipt signal for the mobile communications terminal to be tested. By means of the IFFT, the data signal is transformed from the frequency domain into the time domain. In this manner, a receipt signal in the time domain, as is typically received via the air interfaces during normal operation of a mobile communications terminal to be tested, is emulated for the test.

According to a typical development, the communications interface is designed to establish a hard-wired communication link to the mobile communications terminal to be tested. This prevents the receipt signal that is generated by the testing equipment and supplied to the mobile communications terminal to be tested from being disrupted or being changed in another, unreproducible manner by another channel, for example formed by an air interface.

Where practical, the above embodiments and developments can be combined in any manner. Other possible embodiments, developments and implementations of the invention include combinations of features described above or below in relation to the embodiments, even if said combinations are not explicitly mentioned. More particularly, a person skilled in the art would also add individual aspects to the basic form of the present invention as improvements or additions.

BRIEF DESCRIPTION OF THE DRAWINGS

The present invention will now be explained in more detail below on the basis of the embodiments provided in the schematic figures of the drawings, in which.

The accompanying drawings are intended to provide a better understanding of the embodiments of the invention. They illustrate embodiments and, in combination with the description, explain the principles and concepts behind the invention. Other embodiments and many of the stated advantages will become apparent from the drawings. The elements in the drawings are not necessarily drawn to scale.

In the figures of the drawings, like elements and components or those having the same function or action are in each case provided with the same reference numerals, unless stated otherwise.

DESCRIPTION OF EMBODIMENTS

Figure 1:
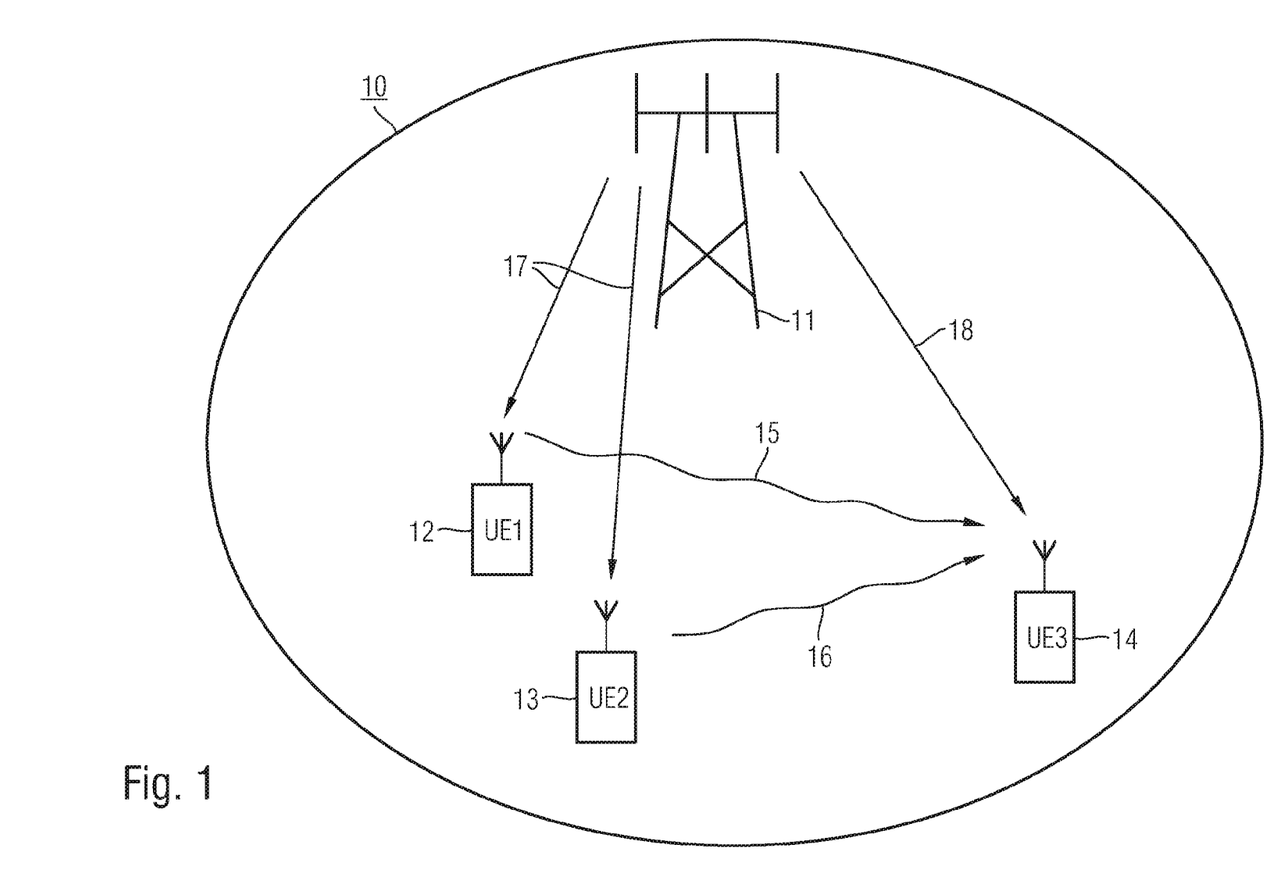
FIG. 1 shows a scenario for D2D communication.

FIG. 1 first shows an example scenario for a D2D communication of mobile communications terminals on the basis of a block diagram. The figure shows a mobile communications cell 10 formed by a base station 11 (also denoted eNodeB). In the example shown, three mobile communications terminals 12, 13, 14 (also denoted UEx) are shown within said mobile communications cell 10. In this case. UE3 denotes the mobile communications terminal 14 to be tested.

The base station 11 configures individual transmission resources (in LTE: SL-DiscTxPoolList) for the two transmitting mobile communications terminals 12, 13 via the connections 17, from which resources the mobile communications terminals 12, 13 select resources at random in order to beam data to the sidelink in the area surrounding them. In addition, corresponding transmission resources are communicated to the receiving mobile communications terminal 14 via the connection 18 as a receipt resource (in LTE: SL-DiscRxPoolList). The individual transmission and receipt resources contain a subset of the time slots and the bandwidth in the frequency domain, which subset is allocated to the particular radio cell 10 defined by the base station 11. Depending on the configuration and protocol of the data communication, transmission data are in turn only transmitted by the individual transmitting mobile communications terminal 12, 13 in a subset of the preconfigured resources.

For the D2D communication, each transmitting mobile communications terminal 12, 13 transmits the data to be transmitted directly to the receiving mobile communications terminal 14 via a sidelink 15, 16.

Figure 2:
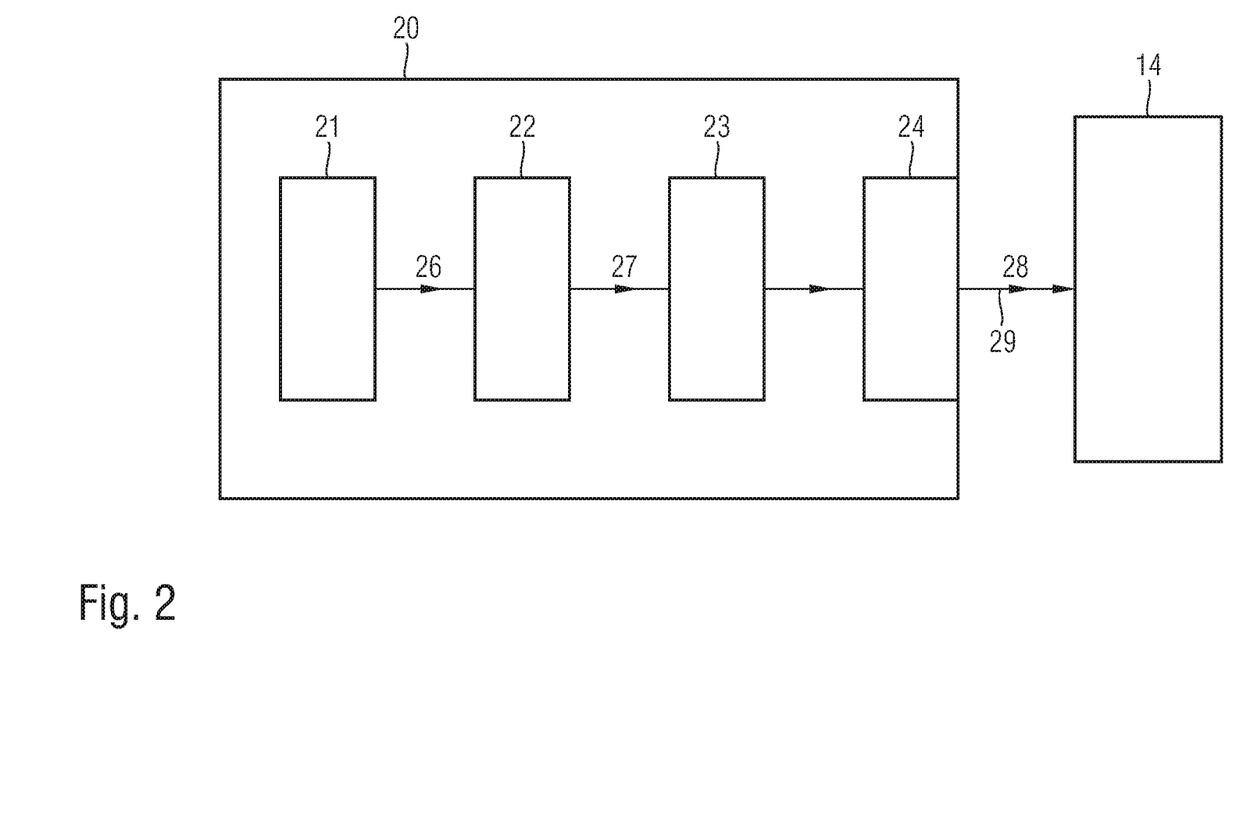
FIG. 2 shows a first, general embodiment of testing equipment according to the invention for testing the D2D communications capabilities of a mobile communications terminal.

FIG. 2 shows a first, general embodiment of HF testing equipment according to the invention for testing the D2D communications capabilities of a mobile communications terminal. In FIG. 2, the testing equipment according to the invention is denoted by reference numeral 20. Said testing equipment 20 represents an HF test assembly, which can also be referred to as HF tester or mobile communications tester.

The testing equipment 20 is communicatively connected to the mobile communications terminal 14 to be tested (or DUT=device under test). The communications standard used in the process is typically predefined by the mobile communications terminal 14. In this example, the LTE standard is intended. The communication link between the testing equipment 20 and the mobile communications terminal 14 enables bi-directional signal exchange between the two components of the testing system.

The HF testing equipment 20 comprises an emulation device 21, a linking device 22, a conversion device 23 and a communications interface 24.

The emulation device 21 is designed to emulate a plurality of mobile communications terminals (not shown here) and thus in particular to replicate the D2D function of these mobile communications terminals. For this purpose, the emulation device 21 emulates a plurality of independent transmission channels, i.e. one transmission channel for each transmitting mobile communications device. One baseband data signal 26 specific to each transmission channel is thus generated for each transmission channel. The baseband data signals 26 are each generated on the basis of a predefined channel model stored in a channel simulator of the emulation device 21.

The linking device 22 is designed to link the baseband data signals 26 generated by the emulation device 21 so as to generate a linked baseband data signal 27.

The conversion device 23 is designed to generate, from the linked baseband data signal 27, a receipt signal 28 for the mobile communications terminal 14 to be tested by converting the linked baseband data signal 27 from the frequency domain into the time domain.

The HF testing equipment 20 is coupled to the mobile communications terminal 14 to be tested via the communications interface 24. By means of this communications interface 24, which includes a hard-wired coaxial connection 29, the receipt signal 28 is transmitted to and received by the mobile communications terminal 14 to be tested.

For testing purposes, it would also be conceivable for there to be a wireless air interface between the testing equipment 20 and the mobile communications terminal 14 to be tested.

In the manner known per se, the testing equipment 20 is thus capable of testing the D2D functionality of said mobile communications terminal 14 to be tested.

The elements of the testing equipment 20, including in particular the emulation device 21, the linking device 22, the conversion device 23 and the communications interface 24, can be implemented either completely or in part in a program-controlled device, such as a microprocessor, a microcontroller and the like.

Figure 3:
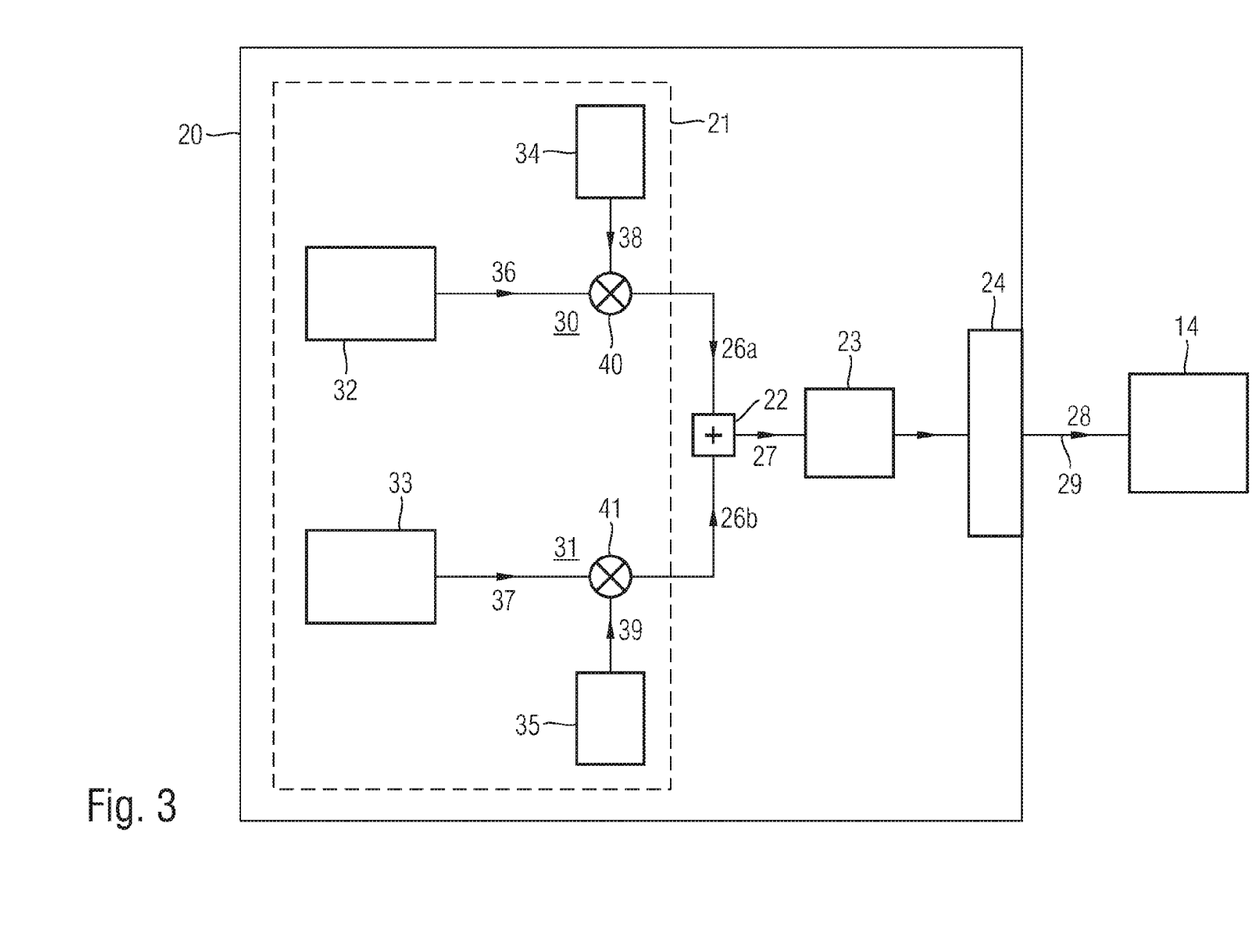
FIG. 3 shows another, preferred embodiment of testing equipment according to the invention for testing the D2D communications capabilities of a mobile communications terminal.

FIG. 3 shows another, preferred embodiment of testing equipment according to the invention for testing the D2D communications capabilities of a mobile communications terminal.

In this figure, the emulation device 21 is designed to replicate two transmission channels 30, 31. For this purpose, the emulation device 21 comprises a signal generator 32, 33 and a channel simulator 34, 35.

A signal generator 32, 33 is designed to generate a data signal 36, 37 for each transmission channel 30, 31.

The channel simulator 34, 35 impresses a predefined channel distortion 38, 39, specific to a particular transmission channel 30, 31, on each data signal 36, 37 from the particular transmission channel. This typically occurs by complex multiplication of the channel distortions 38, 39 by the respective data signals 36, 37 in the multiplication devices 40, 41. This produces the baseband data signals 26a, 26b. From these baseband data signals 26a, 26b, for example, the linked baseband data signal 27 is generated by addition in the linking device 22.

The signal generators 32, 33 and the channel simulators 34, 35 can be implemented by a program-controlled device, such as a microcontroller or a microprocessor. It would also be conceivable for just one signal generator and/or just one channel simulator to be used for a plurality or all of the transmission channels 30, 31.

The calculation of the baseband data signals 26a, 26b for testing purposes is described, for example, in German Patent Application Publication No. DE 10 2008 055 759 A1. This document describes how the channel distortion of a radio transmission in an LTE mobile communications system for testing purposes in the frequency domain can be modelled by means of complex multiplication before the generation of the time domain signal. The same model is used in the present invention by the emulation device 21 to emulate independent transmission channels. In terms of the emulation and modelling of the channel distortion of a radio transmission for testing purposes in the frequency domain by means of complex multiplication before the generation of the time domain signal, the entire content of German Patent Application Publication No. DE 10 2008 055 759 A1 is thus incorporated herein by reference.

In the mobile communications standard LTE of the 3GPP standard, the OFDM (orthogonal frequency division multiplexing) modulation method is used, in which useful information having a high bit rate is divided into a plurality of sub-data streams having a lower bit rate. Each of these sub-data streams is independently modulated by a modulation method, e.g. quadrature amplitude modulation (QAM), at a low bandwidth and applied to a carrier frequency. These are referred to in the following as modulated carried signals. The modulated carrier signals of the individual sub-data streams are added to a transmission signal, the modulated carrier signals being orthogonal to one another owing to the orthogonal nature of the carrier function. Whereas OFDM is directly used in the downlink (i.e. the communication link from the base station to the mobile communications terminal), an OFDM variant is used in the uplink (i.e. the communication link from the mobile communications terminal to the base station) and sidelink (i.e. the D2D communication link between two mobile communications terminals). In this OFDM variant, the data signals are pre-encoded by an FFT operation prior to the modulation stage. The FFT-encoded sample values are digitally modulated in the standard OFDM and impressed onto the individual OFDM sub-carriers. This OFDM variant is also referred to as SC-FDMA (single carrier frequency division multiple access) and leads to a low PAPR (peak to average power ratio) in the generated radio signal, i.e. less pronounced power peaks are produced in the time domain signal. This makes it possible to implement the transmission stages in the mobile communications terminals using more cost-effective power amplifiers.

For the transmission, a multiple antenna system (MIMO=multiple input multiple output) is often used, in which the signal is transmitted from e.g. two or four antennas in the base station to e.g. two or four antennas in the mobile communications terminal. In the process, various pieces of useful information or various sub-data streams can also be transmitted to transmission channels at the same frequency but via different antennas. To decode and reassemble the data stream, it has to be possible to distinguish between the individual transmission channels, which is achieved by assigning different propagation characteristics to each antenna. Owing to the different propagation paths between the various base station antennas and communications device antennas, destructive interference of a transmission signal by reflections and the like is also avoided. This makes a higher bit rate possible while having better transmission quality at the same time. Even if, in the case of D2D communication in the LTE sidelink, only one single transmission antenna is provided on the mobile communications terminal, the transmitted signal can again be received at the receiving mobile communications terminal by e.g. two or four antennas. In the case of the LTE sidelink, this results in an SIMO system (single input multiple output), which is a special case of a general MIMO system.

It is assumed that the testing equipment 20 is designed to be able to also test the mobile communications properties of a mobile communications terminal 20 in addition to the D2D communication. In principle, testing equipment 20 of this type is a radio test assembly, which represents a modified small base station of a mobile communications network. Depending on the desired mobile communications standard, the testing equipment 20 can emulate a specific test network, e.g. a GSM. UMTS or LTE network, so the test can be carried out in a very realistic manner. This type of testing equipment 20 is used to test the HF properties of mobile communications terminals, such as the transmission and receiving capability, data throughput, data volume, etc. To test only the mobile communications properties of the mobile communications terminal 14, it is necessary to couple the testing equipment 20 to the mobile communications terminal 14 to be tested via an air interface. In this test mode, the testing equipment 20 according to the invention then generates an HF test field in which the mobile communications terminal 3 is positioned and tested.

In a preferred embodiment, the testing equipment 20 comprises an HF measuring/evaluation device designed to test the HF properties of the mobile communications terminal 14 coupled to the testing equipment 20 by means of the communications interface.

The testing equipment 20 according to the invention can preferably support a plurality of different protocols of mobile communications standards, such as GSM, CDMA (W-CDMA, CDMA 2000, etc.), UMTS, LTE, etc.

Figure 4:
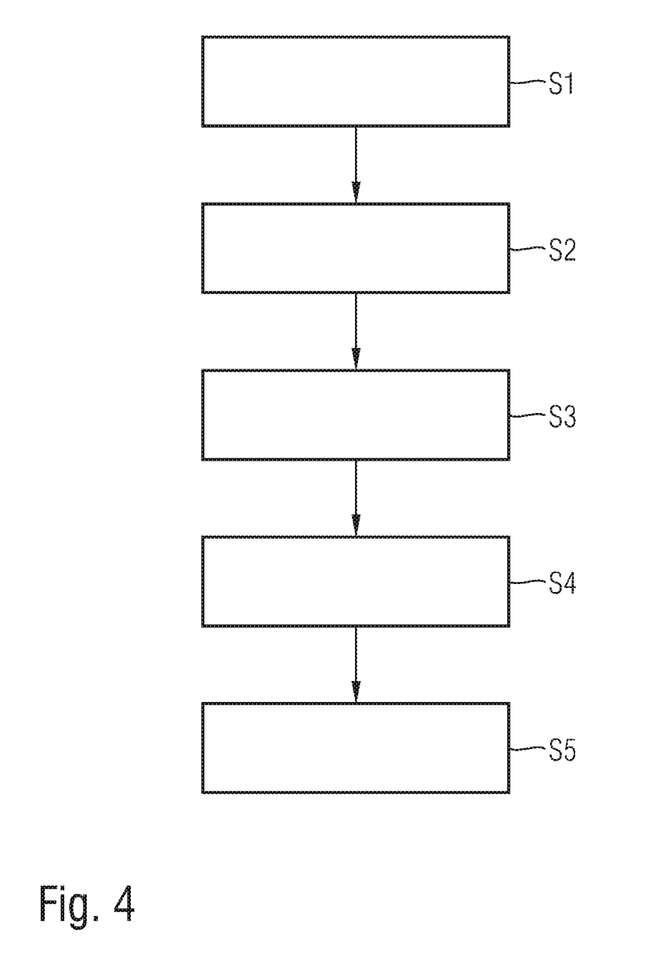
FIG. 4 shows, by means of a flow diagram, the sequence of a method according to the invention for testing the D2D communications capabilities of a mobile communications terminal.

FIG. 4 uses a flow diagram to show the sequence of a test method according to the invention for testing the D2D communications capabilities of a mobile communications terminal by means of HF testing equipment according to the invention, as described for example on the basis of FIGS. 2 and 3.

In a first step S1, a first transmission channel is emulated for a D2D communication link (in LTE: sidelink). In the process, a first baseband data signal specific to the first transmission channel is generated on the basis of a first predefined channel model.

In at least one further step, S2, a second transmission channel is emulated for a D2D communication link, in which a second baseband data signal specific to the second transmission channel is generated on the basis of a second predefined channel model.

In steps S1 and S2, the respective transmission channel-specific baseband data signals are calculated by complex multiplication of the data signal, which is to be transmitted, by the channel coefficients of the channel model.

In at least one subsequent step, S3, the first and second baseband data signals thus generated are linked, for example superimposed by addition.

Next, in step S4, the baseband data signal thus linked is transformed from the frequency domain into the time domain in order to thus generate a receipt signal for the mobile communications terminal 14 to be tested.

Finally, in step S5, the receipt signal thus generated is transmitted to the mobile communications terminal 14 to be tested. The mobile communications terminal 14 can then be tested for its D2D properties.

Although the present invention has been described above on the basis of preferred embodiments, it is not restricted thereto and instead can be modified in many different ways.

This description uses the expression "mobile communications terminal", which should be taken to mean any device that has an integrated mobile communications functionality, regardless of whether additional functionalities are integrated in these devices. For example, besides conventional mobile telephones, mobile communications terminals should be taken to include smartphones, PDAs, tablets, for example also mobile computers, navigation devices, PDAs (personal digital assistants), a vehicle equipped with mobile communications, and the like. More particularly, in the context of the present invention the term mobile communications terminal should be explicitly understood for any radio-based mobile or wireless D2D communication link.

In addition, the present invention should not be limited to the protocols and standards set out above; these are only intended for explanatory purposes.

Lastly, the stated numbers should only be understood as being illustrative and are not intended to limit the invention.

LIST OF REFERENCE NUMERALS

10 mobile communications cell
11 base station, eNodeB
12, 13, 14 mobile communications terminals, user equipment (UE)
14 mobile communications terminal to be tested, device under test (DUT)
15, 16 sidelinks for D2D communication
17 configuration of the transmitting mobile communications terminals
18 configuration of the receiving mobile communications terminal
20 testing equipment
21 emulation device
22 linking device
23 conversion device
24 communications interface
26, 26a, 26b baseband data signals
27 linked baseband data signals
28 receipt signal
29 hard-wired coaxial connection
30, 31 transmission channels
32, 33 signal generator
34, 35 channel simulator
36, 37 data signals
38, 39 channel distortion
40, 41 multiplication devices
S1-S5 method steps

The invention claimed is:

1. HF testing equipment for testing D2D-enabled mobile communications terminals, the testing equipment comprising:
   an emulation device for emulating the D2D function of a plurality of mobile communications terminals, which is designed to emulate a number of independent transmission channels corresponding to the number of mobile communications terminals by generating, for each transmission channel, a baseband data signal specific to a particular transmission channel on the basis of a predefined channel model,
   a linking device designed to link the generated baseband data signals,
   a conversion device designed to generate a receipt signal for a mobile communications terminal to be tested by converting the linked baseband data signal from a frequency domain into a time domain,
   a communications interface by means of which the HF testing equipment can be coupled to the mobile communications terminal to be tested and by means of which the receipt signal can be sent to the mobile communications terminal to be tested.

2. The testing equipment of claim 1, wherein the emulation device comprises a signal generator and a channel simulator, wherein the signal generator being designed to generate a data signal for each transmission channel, and wherein the channel simulator being designed to impress a predefined channel distortion, specific to a particular transmission channel, on each data signal of the particular transmission channel.

3. The testing equipment of claim 2, wherein the signal generator is designed as protocol testing equipment that encodes the data to be transmitted according to a predetermined protocol stack.

4. The testing equipment of claim 2, wherein the channel simulator is designed to replicate the properties of a transmission channel by varying the corresponding data signal to be transmitted according to the predefined channel model in order to generate the transmission channel-specific baseband data signal.

5. The testing equipment of claim 2, wherein the channel simulator is designed to use constant filter coefficients to generate the transmission channel-specific baseband data signal.

6. The testing equipment of claim 2, wherein the channel simulator is designed to use variable filter coefficients to generate the transmission channel-specific baseband data signal.

7. The testing equipment of claim 2, wherein the channel simulator is designed to use different channel coefficients to simulate a predefined channel distortion for each transmission channel.

8. The testing equipment of claim 1, wherein the emulation device is designed to calculate the transmission channel-specific baseband data signal by complex multiplication of the data signal, which is to be sent, by the filter coefficients of the channel model.

9. The testing equipment of claim 1, wherein the emulation device is designed to provide data to be transmitted, to assign the data to be transmitted a plurality of carrier frequencies and encoding parameters per transmission channel, to generate a plurality of modulated carrier data signals according to the assigned carrier frequencies and encoding parameters, and to distort at least one of the modulated carrier data signals by means of a predefined frequency-selective channel model.

10. The testing equipment of claim 1, wherein the emulation device is designed to replicate various test scenarios.

11. The testing equipment of claim 1, wherein the conversion device is designed to carry out an IFFT transformation on the linked baseband data signal in order to form a receipt signal for the mobile communications terminal to be tested.

12. The testing equipment of claim 1, wherein the communications interface is designed to establish a hard-wired communication link to the mobile communications terminal to be tested.

13. A method for testing mobile communications terminals by means of testing equipment, comprising the steps of:
  emulating a first transmission channel for a D2D communication link by generating a first baseband data signal, specific to the first transmission channel, on the basis of a first predefined channel model;
  emulating at least a second transmission channel, different from the first transmission channel, for a D2D communication link by generating a second baseband data signal, specific to the second transmission channel, on the basis of a second predefined channel model;
  linking the generated first and second baseband data signals;
  converting the linked baseband data signal from a frequency domain into a time domain in order to generate a receipt signal for a mobile communications terminal to be tested;
  sending the generated receipt signal to the mobile communications terminal to be tested.

14. The method of claim 13, wherein during the step of emulating the first transmission channel or the second transmission channel, the transmission channel-specific baseband data signal is calculated by complex multiplication of the data signal, which is to be transmitted, by the channel coefficients of the channel model.

15. The method of claim 13, wherein the step of emulating the first transmission channel or the second transmission channel includes:
  providing data to be transmitted;
  assigning the data to be transmitted a plurality of carrier frequencies and encoding parameters per transmission channel;
  generating a plurality of modulated carrier data signals according to the assigned carrier frequencies and encoding parameters;
  distorting at least one of the modulated carrier data signals by means of a predefined frequency-selective channel model.

16. The method of claim 13, wherein the testing is performed by means of a HF testing equipment for testing D2D-enabled mobile communications terminals, the test equipment comprising: an emulation device for emulating the D2D function of a plurality of mobile communications terminals, which is designed to emulate a number of independent transmission channels corresponding to the number of mobile communications terminals by generating, for each transmission channel, a baseband data signal specific to a particular transmission channel on the basis of a predefined channel model; a linking device designed to link the generated baseband data signals; a conversion device designed to generate a receipt signal for a mobile communications terminal to be tested by converting the linked baseband data signal from the frequency domain into the time domain; a communications interface by means of which the HF testing equipment can be coupled to the mobile communications terminal to be tested and by means of which the receipt signal can be sent to the mobile communications terminal to be tested.

* * * * *